June 19, 1962 L. G. MILLER 3,040,309
COMPONENT MONITORING CIRCUIT
Filed Oct. 15, 1958

WITNESSES
Leon J. Taza
Myron E. Click

INVENTOR
Lalan G. Miller
BY
F. E. Browder
ATTORNEY

United States Patent Office 3,040,309
Patented June 19, 1962

3,040,309
COMPONENT MONITORING CIRCUIT
Lalan G. Miller, Pittsburgh, Pa., assignor to Westinghouse Electric Corporation, East Pittsburgh, Pa., a corporation of Pennsylvania
Filed Oct. 15, 1958, Ser. No. 767,420
9 Claims. (Cl. 340—250)

This invention relates to monitoring circuits in general and, in particular, to component monitoring circuits for indicating a failure of a predetermined number of a plurality of semiconductor rectifier diodes connected in parallel.

One of the problems associated with operating semiconductor rectifier diodes in parallel in a bank, each with its own individual fuse, is counting the rectifier diode failures. It would usually be desirable to give an alarm on the first failure to occur in a group of paralleled rectifier units but to allow the remainder of the paralleled rectifier units to continue to operate. At some predetermined number of failures, it would be desirable to trip the entire paralleled group of rectifiers or bank off the line or supply voltage.

Accordingly, it is an object of this invention to provide an improved monitoring circuit.

It is another object of this invention to provide an improved monitoring circuit for paralleled electrical components, particularly paralleled semiconductor rectifiers.

It is still another object of this invention to provide an improved monitoring circuit which counts the number of rectifier diode failures in a plurality of paralleled rectifier diodes, in particular, indicating a first failure in said plurality of rectifier units and after a predetermined number of failures removing the entire rectifier system from the line or supply voltage.

Further objects of this invention will become apparent when taken in conjunction with the accompanying drawing. In said drawing, for illustrative purposes only, there is shown a preferred embodiment of the invention.

Figure 1:
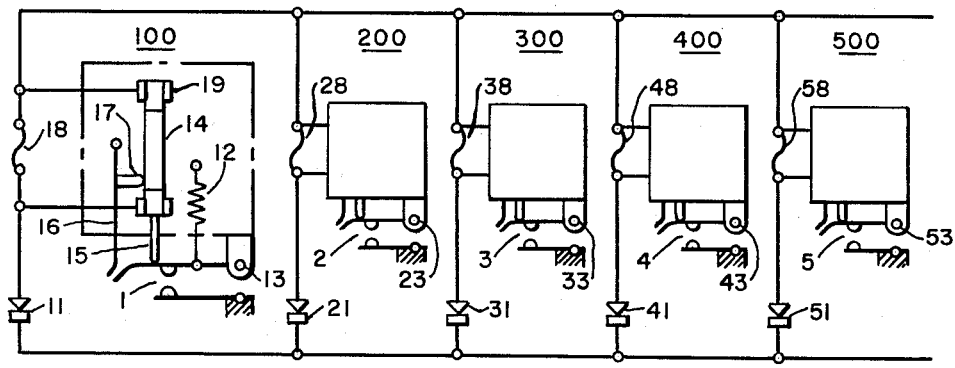
FIGURE 1 is a schematic diagram illustrating a circuit for closing contacts in response to the failure of a single diode element, a plurality of said diode elements and contact closing circuits being connected in parallel.

Referring to FIG. 1, there is shown a plurality of power rectifiers 11, 21, 31, 41 and 51 with their respective associated individual fuses 18, 28, 38, 48 and 58, connected in a parallel rectifying bank. Each fuse is connected in series with its associated power rectifier. Indicating circuits 100, 200, 300, 400 and 500 are provided to actuate the closing of contacts 1, 2, 3, 4 or 5 in response to the failure of one or more of the respective diodes 11, 21, 31, 41 and 51.

Each indicating circuit is identical, so for the purposes of simplicity only the first indicating circuit 100 is shown in detail and an explanation of its operation will suffice to explain the operation of the remaining indicating circuits.

The indicating circuit 100 comprises a trigger fuse 14 connected across the power fuse 18. The trigger fuse 14 has a plunger mechanism 15 which is released whenever the trigger fuse 14 blows. The trigger fuse 14 will blow in response to the blowing of the main fuse 18 whenever the power rectifier unit 11 fails or shorts in a reverse direction. The contacts 1 are normally open contacts and are held so by the cooperation of a spring 12 and pivotal mounting means 13 for one side of said contacts 1. The spring 12 is connected to said pivotally mounted contact 1 and maintains the contacts 1 in a normally open position. The plunger 15 of the trigger fuse 14 is disposed with respect to the contacts 1 so that whenever the trigger fuse 14 blows the plunger 15 is released and closes the contact 1. A leaf spring 16 is disposed with respect to said pivotally mounted contact 1 as to bear against said pivotally mounted contact 1 and close said contacts 1 whenever a trigger fuse 14 is not in place. Whenever the trigger fuse 14 is placed in position in a suitable holding mechanism, such as spring clips 19, the trigger fuse 14 bears against a cam 17 attached to the leaf spring 16 which allows the contacts 1 to be held in a normally open position by the spring 12.

Thus it can be seen that when any one of the power rectifier units 11, 21, 31, 41 and 51 fails, the contact closing or indicating circuits 100, 200, 300, 400 and 500 will close the respective contacts 1, 2, 3, 4 and 5.

Although the indicating circuits of FIG. 1 have been illustrated as mechanical contact closing means in response to the blowing of a trigger fuse connected in parallel with the main protective fuse, other suitable means for electrically closing a switching means may be utilized. Such switching means, e.g., transistor devices, magnetic amplifiers, etc., may be triggered electrically closed in response to a signal derived from the blowing of the main protective fuse connected in series with the power semiconductor rectifier or other electrical component which is being monitored.

Figure 2:
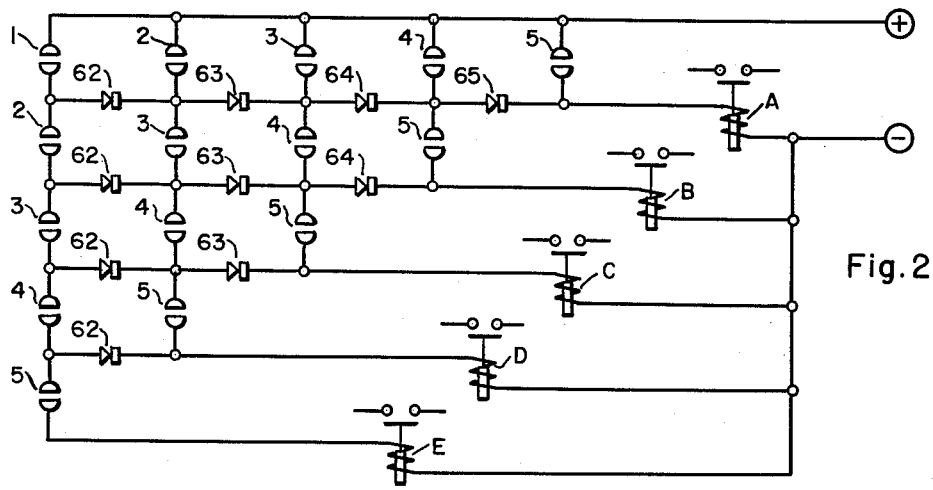
FIG. 2 is a schematic diagram of the contacts of the apparatus of FIG. 1 arranged in a counting and indicating schematic.

Referring to FIG. 2, there is shown a counting circuit for use in conjunction with the contact closing circuits and the contacts of FIG. 1 for indicating a desired predetermined number of failures of the power rectifier units.

The array of FIG. 2 comprises a plurality of rows and columns of the contacts or switching means of the apparatus of FIG. 1. The first row comprises a contact of each of the N number of indicating circuits of FIG. 1 connected in parallel between a top conductor of the array and a first alarm bus. Each succeeding row contains one less contact of one of the indicating circuits of FIG. 1. The first contact from the left of the array is eliminated and the remaining contacts are shifted one position to the left in the array and connected in parallel between succeeding alarm buses in the same order as in the preceding row. Thus, there are an N number of rows of contacts in a complete array as there are an N number of indicating circuits of the paralleled power semiconductor rectifiers of FIG. 1.

The complete array of FIG. 2 also has an N number of columns formed by the parallel rows of positioned contacts. The first column contains an N number of contacts, one of each of the indicating circuits of FIG. 1, connected in series and in the same order from the top to the bottom of the array as the corresponding contacts are arranged from right to left in the first row of the array. Succeeding columns contain corresponding contacts connected in a corresponding order to a row corresponding in number to each succeeding column. Rectifiers serve as electrical isolation means isolating each of the contacts in a succeeding column from the contacts in a preceding column.

The top conductor of the array is connected to one side of an alarm power supply and may be termed an alarm supply bus. Each succeeding conductor connecting the rows of contacts in parallel may be an alarm bus. Each respective alarm bus is connected to provide a return path, upon energization by the closing of one of its respective contacts, to the alarm supply voltage source, not shown. Each alarm bus may have circuit means associated therewith which, upon energization of the alarm bus, will activate an alarm means, e.g. a buzzer, a lamp, etc., or remove the bank of rectifiers from the power supply. This circuit means is shown in FIG. 2 as a relay connected in series with each alarm bus. The relays may activate an alarm circuit or a circuit breaker to remove the entire bank of rectifiers from the power line.

Although a complete array has been shown in FIG. 2, only the number of rows to indicate the desired predetermined number of power rectifier failures are necessary. For example, if after the failure of three power rectifiers, it is desired to remove the bank of power rectifiers from service only the first three rows of the array are necessary. Also, circuit means responsive to the energization of each alarm bus is necessary only when, for example, the first and two other power rectifiers have failed, then, using the relays of FIG. 2, relay need only be placed in series with the first and third alarm buses.

In operation, as successive diodes fail in the circuit of FIG. 1, successive relays of the relays A, B, C, D and E will be energized. The contacts illustrated in FIG. 1 may be multiple contacts to provide for an easier assembly, easier electrical isolation therebetween, and easier wiring job of the array illustrated in FIG. 2. As an example of the operation of the array, let us assume that the rectifier diode 41 fails. The contacts 4 will then be closed as hereinbefore described. Therefore, all of the contacts 4 of the array shown in FIG. 2 will be closed in the first 4 rows. However, because of the isolating rectifiers 64, current from the voltage source, not shown, supplying the array will flow only through the contact 4 in the first row and energize the relay A. That is, column IV is isolated from column III by the isolating rectifier 64. Now let us assume that the power rectifier 21 fails thus closing the contacts 2 in the first two rows in the array of FIG. 2. Current may now flow through the contact 2 in the first row of the array forward through an isolating rectifier 63, through the closed contact 4 in the second row of the array and through the isolating rectifier 64 to energize the relay B. If a third diode fails, for example the power rectifier unit 51, the contact 5 in the row 3 of the array will close thus allowing the relay C to be energized. The operation of the array will continue until all of the rectifier power units of the apparatus of FIG. 1 have failed and energized all of the relays connected to the array of FIG. 2. Relays need be used only in the alarm buses of the array of FIG. 2, where desired to indicate the failure of the diodes of the apparatus of FIG. 1 singly, successively, or singly and after a predetermined number of diode failures. The relays A, B, C, D, and E may be utilized as hereinbefore stated to energize indicating lamps or buzzers or to energize circuit breaker means for disconnecting the rectifier bank of FIG. 1 from the line or supply voltage.

Figure 3:
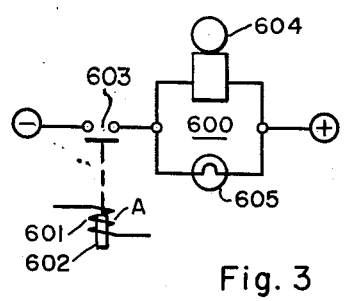
FIG. 3 is a schematic diagram of an alarm circuit responsive to the failure of a single rectifier diode element.

Referring to FIG. 3, there is shown an alarm circuit 600 which may be utilized to indicate the failure of a single rectifier unit of the bank of FIG. 1. The relay A of FIG. 2 is used as an example whenever the relay coil 601 is energized by the failure of a rectifier unit, as discussed hereinbefore, the armature 602 closes the contacts 603 of the relay A. Therefore, current is allowed to flow to a suitable alarm means such as the buzzer 64 or indicating lamp 605.

Figure 4:
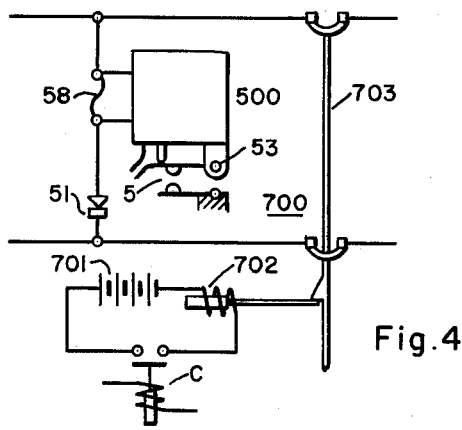
FIG. 4 is a schematic diagram of circuit means for removing the rectifier bank of FIG. 1 from service in response to the failure of a predetermined number of rectifier diode elements.

Referring to FIG. 4, there is shown a schematic diagram of circuit means 700 for removing the rectifier bank of FIG. 1 from service in response to the failure of a predetermined number of rectifier diode units. The relay C of FIG. 2 has been selected to serve as an example. When the relay C is energized in response to current flow in its alarm bus by the failure of three rectifier units, as discussed hereinbefore, the contacts of relay C close and allow the trip coil 702 of the circuit breaker 703 to be energized by the voltage source 701. The trip coil 702 actuates the circuit breaker 703 and interrupts the application of the line or power supply voltage to the rectifier bank of FIG. 1.

In conclusion, it is pointed out that while the illustrated example constitutes a practical embodiment of my invention, I do not limit myself to the exact details shown, since modification of the same may be effected without departing from the spirit and scope of this invention.

I claim as my invention:

1. A component monitoring circuit comprising: a bank of paralleled electrical components; each of said components having connected in series therewith an individual protective fuse; an indicating circuit for each of said electrical component units connected in parallel with said fuse; counting circuit means comprising normally-open switching means corresponding to each said indicating circuit; said switching means being electrically closed by said indicating circuit in response to the blowing of said protective fuse; means for connecting said switching means in an array comprising a plurality of parallel circuits and a plurality of series circuits; a first parallel circuit of said array compressing a switching means of each of said indicating circuits connected in parallel; each succeeding parallel circuit of said array containing one less switching means than the previous parallel circuit; each series circuit of switching means of said array being formed by serially connecting switching means of said parallel circuits; rectifier means preventing current flow from a succeeding series circuit to a preceding series circuit of said array.

2. A component monitoring circuit comprising: a bank of paralleled electrical components; each of said components having connected in series therewith an individual protective fuse; an indicating circuit for each of said electrical component units connected in parallel with said fuse; counting circuit means comprising normally-open switching means corresponding to each said indicating circuit; said switching means being electrically closed by said indicating circuit in response to the blowing of said protective fuse; means for connecting said switching means in an array comprising a plurality of parallel connected circuits and a plurality of series connected circuits; a first parallel connected circuit of said array comprising switching means of each of said indicating circuits connected in parallel; each succeeding parallel connected circuit of said array containing one less switching means than the previous parallel connected circuit; each series connected circuit of switching means of said array being formed by serially connecting switching means of said parallel connected circuits; rectifier means preventing current flow from a succeeding series connected circuit to a preceding series connected circuit of said array; and a circuit connected to each of said parallel connected circuits of said array for obtaining a signal from each of said parallel connected circuits of said array.

3. A component monitoring circuit comprising: a bank of paralleled electrical components; each of said components having connected in series therewith an individual protective fuse; an indicating circuit for each of said electrical component units connected in parallel with said protective fuse; counting circuit means comprising normally-open switching means corresponding to each said indicating circuit; said switching means being electrically closed by said indicating circuit in response to the failure of said protective fuse; means for connecting said switching means in an array comprising a plurality of parallel connected circuits and series connected circuits; a first parallel connected circuit of said array comprising switching means of each of said indicating circuits connected in parallel; each succeeding parallel connected circuit of said array containing one less switching means than the previous parallel connected circuit of the array; each series connected circuit of switching means of said array being formed by serially connecting switching means of said parallel connected circuits; rectifier means preventing current flow from a succeeding series connected circuit of said array to a preceding series connected circuit of said array; a plurality of buses providing connections to said parallel connected circuits of said array; circuit means responsive to current flow in said buses which is operative to energize an alarm circuit.

4. A component monitoring circuit comprising: a bank of paralleled electrical components; each of said components having connected in series therewith an individual protective fuse; an indicating circuit for each of said electrical component units connected in parallel with said protective fuse; counting circuit means comprising normally-open switching means corresponding to each said indicating circuit; said switching means being electrically closed by said indicating circuit in response to the failure of said protective fuse; means for connecting said switching means in an array comprising a plurality of parallel connected circuits and a plurality of series connected circuits; a first parallel connected circuit of said array comprising switching means of each of said indicating circuits connected in parallel; each succeeding parallel circuit of said array containing one less switching means than the preceding parallel circuit, each series connected circuit of said array being formed by serially connecting switching means of said parallel circuits; rectifier means preventing current flow from a succeeding series connected circuit to a preceding series connected circuit of said array; a plurality of buses providing connections to said parallel connected circuits of said array; circuit means responsive to current flow in said buses which is operative to energize an alarm circuit; circuit means responsive to current flow in one of said plurality of buses which is operative to actuate circuit breaker means to interrupt the application of a supply voltage to said paralleled bank.

5. A component monitoring circuit comprising: a bank of paralleled electrical components; each of said components having connected in series therewith an individual protective fuse; an indicating circuit for each of said electrical component units connected in parallel with said protective fuse; counting means comprising normally-open switching means corresponding to each said indicating circuit; said switching means being electrically closed by said indicating circuit in response to the failure of said protective fuse; means for connecting said switching means in an array comprising a plurality of parallel circuits and a plurality of series circuits; a first parallel circuit of said array comprising switching means of each of said indicating circuits connected in parallel; each succeeding parallel circuit of said array containing one less switching means than the previous parallel circuit, each series circuit of switching means of said array being formed by serially connecting switching means of said parallel circuit; rectifier means preventing current flow from a succeeding series circuit to a preceding series circuit of said array; a plurality of power buses connected to said parallel circuits of said array, circuit means responsive to current flow in a predetermined bus of said plurality of buses which is operative to actuate circuit breaker means and interrupt the application of a supply voltage to said paralleled bank.

6. A component monitoring circuit comprising: a bank of paralleled electrical components; each of said components having connected in series therewith an individual protective fuse; an indicating circuit for each of said electrical component units; each said indicating circuit comprising a trigger fuse connected in parallel with said individual protective fuse; each said trigger fuse having a plunger releasable in response to the blowing of said trigger fuse; counting means comprising normally-open switching means corresponding to each said indicating circuit; said switching means being electrically closed by said indicating circuit in response to the blowing of said trigger fuse; means for connecting said switching means in an array comprising a plurality of parallel connected circuits and a plurality of series connected circuits; a first parallel connected circuit of said array comprises a switching means of each of said indicating circuits connected in parallel; each succeeding parallel connected circuit of said array contains one less switching means than the previous parallel connected circuit, each series circuit of switching means of said array being formed by serially connecting switching means of said parallel connected circuits; rectifier means preventing current flow from a succeeding series connected circuit to a preceding series connected circuit of said array.

7. A component monitoring circuit comprising: a bank of paralleled electrical components; each of said components having connected in series therewith an individual protective fuse; an indicating circuit for each of said electrical component units; each said indicating circuit comprising a trigger fuse connected in parallel with said individual protective fuse; each said trigger fuse having a plunger releasable in response to the blowing of said trigger fuse; counting means comprising normally-open switching means corresponding to each said indicating circuit; said plunger being disposed to mechanically close said switching means when released; said switching means being electrically closed by said trigger fuse in response to the failure of said electrical component being monitored by said indicating circuit; said switching means being connected in an array comprising a plurality of parallel connected circuits and a plurality of series connected circuits; a first parallel connected circuit of said array comprises a switching means of each of said indicating circuits connected in parallel; each succeeding parallel connected circuit of said array contains one less switching means than the previous parallel connected circuit, each series connected circuit of switching means of said array being formed by serially connecting switching means of said parallel circuits; rectifier means preventing current flow from a succeeding series connected circuit to a preceding series connected circuit of said array.

8. A component monitoring circuit comprising: a bank of paralleled electrical components; each of said components having connected in series therewith an individual protective fuse; an indicating circuit for each of said electrical component units; each said indicating circuit comprising a trigger fuse connected in parallel with said individual protective fuse; each said trigger fuse having a plunger releasable in response to the blowing of said trigger fuse; counting circuit means comprising normally-open switching means corresponding to each said indicating circuit; said plunger being disposed to mechanically close said switching means when released; said switching means being electrically closed by said trigger fuse in response to the failure of said electrical component being monitored by said indicating circuit; means for closing said switching means whenever said trigger fuse is not in place in said indicating circuit; said switching means being connected in an array comprising a plurality of parallel connected circuits and a plurality of series connected circuits; a first parallel connected circuit of said array comprises a switching means of each of said indicating circuits connected in parallel; each succeeding parallel connected circuit of said array contains one less switching means than the previous parallel connected circuit, each series connected circuit of said switching array being formed by serially connecting switching means of said parallel circuits; rectifier means preventing current flow from a succeeding series connected circuit to a preceding series connected circuit of said array.

9. A monitoring circuit for indicating the number of failures in a bank of parallel connected rectifiers, each of said rectifiers having connected in series therewith an individual protective fuse, a circuit connected in parallel with each of said fuses for indicating when a fuse has blown, each of said circuits connected in parallel with each said fuse comprising normally open contacts, said contacts being closed by blowing of a fuse, said contacts of said circuits which are connected in parallel with each said fuse being connected in an array of a plurality of parallel connected circuits and a plurality of series connected circuits to provide a counting circuit, said counting circuit being responsive to the closing of said contacts to indicate the number of failures in the bank of rectifiers.

References Cited in the file of this patent

UNITED STATES PATENTS

| | | |
|---|---|---|
| 2,807,771 | Winograd | Sept. 24, 1957 |
| 2,813,243 | Christian et al. | Nov. 12, 1957 |
| 2,930,961 | Lezan | Mar. 29, 1960 |